Dec. 31, 1929.                L. P. HYNES                 1,742,159
                         ELECTRIC HEATING SYSTEM
                       Original Filed March 11, 1922

Inventor:
Lee P. Hynes,
By his attorney
E. M. Bentley

Patented Dec. 31, 1929.

1,742,159

UNITED STATES PATENT OFFICE

LEE P. HYNES, OF ALBANY, NEW YORK, ASSIGNOR TO CONSOLIDATED CAR-HEATING COMPANY, INC., OF ALBANY, NEW YORK, A CORPORATION OF NEW YORK

ELECTRIC HEATING SYSTEM

Original application filed March 11, 1922, Serial No. 543,078. Divided and this application filed February 17, 1928. Serial No. 255,061.

For a detailed description of the present form of my invention, reference may be had to the following specification and to the accompanying drawing forming a part thereof, wherein—

Figure 1:
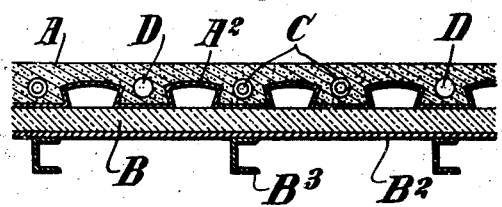
Figure 2:
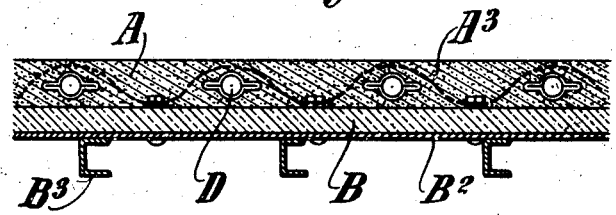

Figs. 1 and 2 show a cross section of a flooring embodying two different forms of my invention.

My present invention was originally included in my application for Patent Serial No. 543,078, filed March 11, 1922, on an Electric heating system, but has been cancelled therefrom and made the subject of the present divisional application. It relates to the heating of a vehicle or other compartment by means of heaters contained in the floor of the car or compartment, being a specific form of the matter claimed generically in the original application aforesaid.

In the drawing $B^2$ represents a sheet steel floor laid on underlying beams $B^3$. A layer of heat-insulating material B, such as asbestos, is applied to the steel plating $B^2$ aforesaid and above that is the flooring A or similar material wherein is embedded a convolute metal stiffener which may take the form of a corrugated sheet $A^2$, as shown in Fig. 1, or a corrugated wire netting, as shown at $A^3$ in Fig. 2. In the folds of the aforesaid stiffener are ducts D for the heating agency. These ducts may be formed in the cement A, as shown in Fig. 1, or they may be formed, as shown in Fig. 2, of metal tubes rolled town to a reduced size with the surplus metal spread out as side ribs on the tube at diametrically opposite points thereof. The metallic stiffener is positioned to strengthen that portion of the floor through which the ducts pass and the convolutions of said stiffener are so arranged that they pass around the positions of said ducts.

In case the heating is of the electrical type, it will be preferably produced by separable heating coils which may be introduced into or withdrawn from the said ducts, as shown and described in the original application aforesaid. Such coils are indicated in Fig. 1 at C.

What I claim as new and desire to secure by Letters Patent is:

1. A floor heating system comprising a floor supporting means, a compartment-floor of cement or similar material having heating ducts therein, heat insulation interposed between said floor and said floor supporting means, and a metallic stiffener for said compartment-floor positioned to strengthen that portion of the floor through which the ducts pass.

2. A floor-heating system comprising a compartment-floor of cement or similar material, a stiffener therein of corrugated metal, heating tubes in the corrugations thereof and heat-insulating material between said floor and the underlying support.

3. A floor heating system comprising a compartment-floor of cement or similar material having heating ducts therein, and a convolute metallic stiffener in said floor, the convolutions thereof being arranged to pass around the positions of said ducts.

4. A floor-heating system comprising a compartment-floor of cement or similar material, a corrugated metal stiffener therein and ducts for separable electric heaters in the folds of said corrugated stiffener.

5. An electric heating system comprising an insulating layer forming the floor of a compartment to be heated, a corrugated metal stiffener therein, and insulating ducts parallel to the corrugations of said stiffener and separable heating coils in said ducts.

6. An electric heating system comprising an insulating layer forming the floor of a compartment to be heated, a corrugated stiffener therein, metal-lined ducts therein parallel to the corrugations of said stiffener, and separable heating coils in said ducts.

Signed at New York city, borough of Manhattan, county of New York, State of New York, this 16th day of February, 1928.

LEE P. HYNES.